United States Patent Office 2,989,569
Patented June 20, 1961

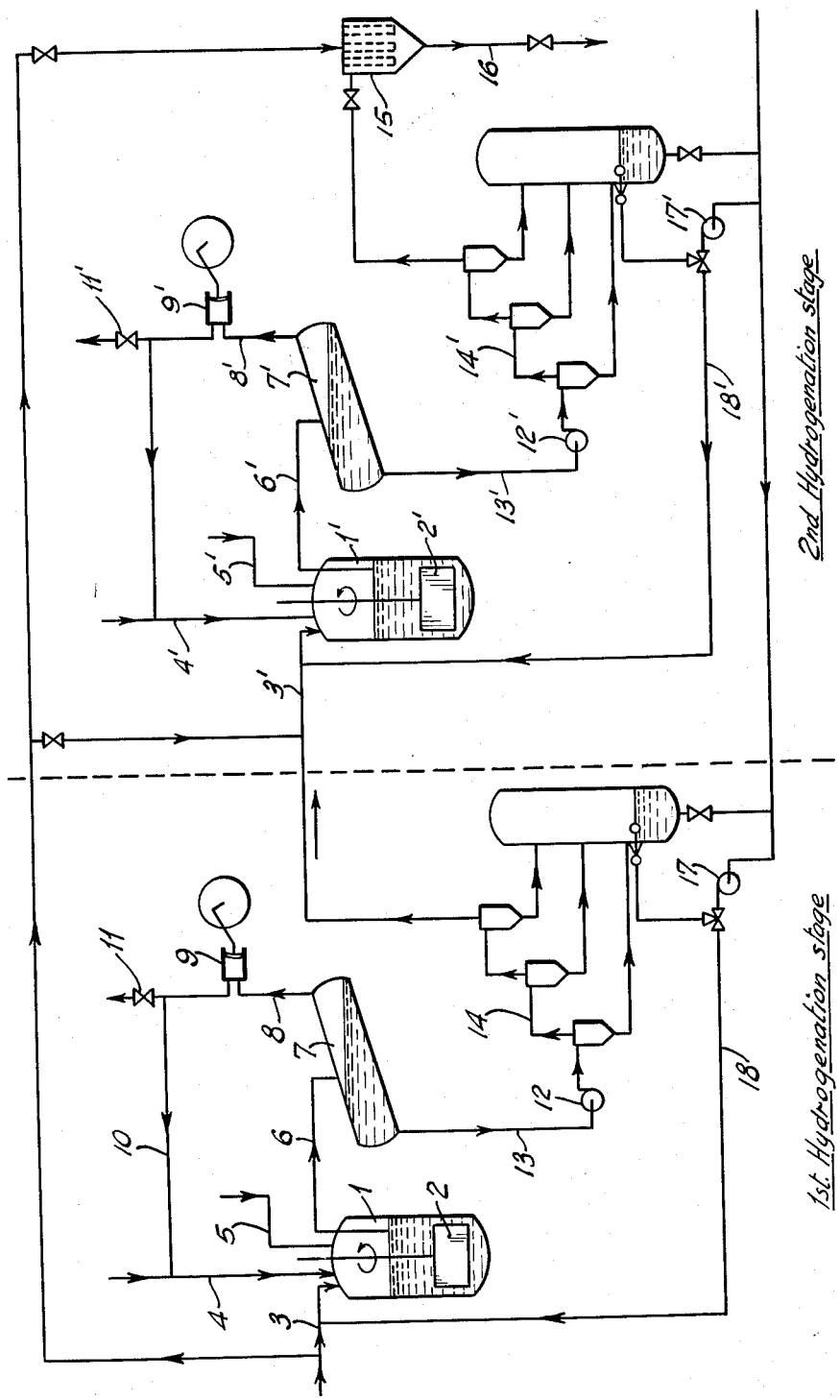

2,989,569
CONVERSION OF WOOD SUGARS TO POLYOLS

Alfons Apel, Mannheim-Rheinau, Germany, assignor to UDIC Société Anonyme, Vevey, Switzerland
Filed June 17, 1958, Ser. No. 742,618
1 Claim. (Cl. 260—635)

The invention relates to the preparation of polyols by hydrogenation of mother liquors obtained in the hydrolysis of cellulosic materials, particularly wood.

In the wood saccharification, various sugars are obtained in addition to dextrose or glucose, and it has been the aim of the industry to convert the by-products of the dextrose production to commercial uses in order to improve the economy of the process. One way of such utilization consists in the hydrogenation of the sugars to polyols.

In such hydrogenation of wood sugars, the difficulty arises that the mother liquors contain sugars which are unstable under normal hydrogenation conditions; for instance, xylose forms furfurol, which in turn reacts with unconverted sugars to resinous condensation products.

It is a principal object of the invention to provide a hydrogenation method of sugars where side-reactions are effectively prevented.

Other objects and advantages will be apparent from a consideration of the specification and claims.

In the following, I will describe the application of my invention to the hydrogenation of wood sugar liquors obtained in the Bergius-Rheinau process; it will be obvious to the skilled in the art that the method can be employed also for the hydrogenation of liquors obtained by other wood saccharification methods or from the saccharification of other cellulosic vegetable materials containing hemicelluloses and pentosans.

The Bergius-Rheinau process is preferably carried out in such a way that wood, for instance sawdust, is first treated in a so-called prehydrolysis step with hydrochloric acid of low or medium concentration; preferably, a 29 to 37% HCl is used at temperatures of about 15 to 30° C., whereby the concentration depends on the nature of the starting material. In this prehydrolysis step, the hemocelluloses and pentosans are dissolved and hydrolyzed essentially to pentoses.

The solid residue from the prehydrolysis step is then subjected at a temperature of about 15 to 30° C. to the main hydrolysis with hydrochloric acid of about 39 to 42% HCl. The obtained solution is worked up to a sugar syrup from which the major part of the glucose content is recovered by crystallization.

For the preparation of polyols, the prehydrolysis liquor, either as such or after precipitation of xylose, and the mother liquor from the glucose crystallization are hydrogenated, either separately or combined, in aqueous or methanolic solution. Suitable catalysts are nickel and/or copper, also in combination with other metals such as manganese or chromium.

According to the invention, the hydrogenation of the liquors containing a mixture of sugars including pentoses such as xylose is carried out in two steps. The sugar solution is hydrogenated in the first step at temperatures of about 40 to 90° C. to a hydrogenation degree of about 75 to 95 percent, and the hydrogenation is then completed in a separate step at a temperature higher than in the first step but not exceeding about 130° C. The hydrogen pressure may be in the range of about 10 to 100 atm., but will preferably be held below 60 atm. so as not to require expensive construction materials for the reaction vessels. Preferably, I apply in the first step pressures of about 40 to 60 atm. and in the second step pressures of about 20 to 40 atm. As the rate of hydrogenation is, for equal temperatures and sugar concentrations, a function of the amount of catalyst and of the hydrogen pressure, lower pressures can be used for higher catalyst concentrations.

The sugar concentration in the sugar solution to be hydrogenated is about 20 to 60 percent by weight. Higher concentrated solutions are so viscous as to render difficult the processing steps such as recovery of the catalyst, de-ionization, and purification. At lower concentrations, the process becomes uneconomical.

An apparatus suitable for continuous operation of the process is shown, by way of example, in the accompanying drawing.

The apparatus comprises a first reactor 1 equipped with a stirrer 2, inlet conduit 3 for the liquid, inlet conduit 4 for hydrogen, and inlet conduit 5 for the catalyst. From reactor 1, the partially hydrogenated solution passes through line 6 into a phase separator 7, from which the gas is returned through line 8, pump 9, line 10 into line 4. Part of the gas is released through valved line 11 to remove inert gas. The solution is pumped by pump 12 from the phase separator 7 through line 13 into a 3 stage cyclone aggregate 14 and from there into the second hydrogenation step.

Said second step comprises a reactor 1' and the same elements as stage 1, which are designated with 3' ... 14'. From the cyclone 14', the solution is passed under pressure through a filter 15 and the obtained polyol solution is recovered through the valved line 16.

The catalyst recovered in the cyclones 14, 14' is pumped by pumps 17, 17' into lines 18, 18' and returned into lines 3, 3', respectively.

All parts of the apparatus not essential to an understanding of the invention, for example circuits and pumps connecting the filters, and the like have been omitted from the drawing for the purpose of clarity.

The use of the apparatus for the purpose of the invention is shown in the following examples. All parts are given by weight unless otherwise indicated.

Example 1

A prehydrolysis sugar solution was obtained from beech wood saw dust by hydrolysis with an aqueous about 32% HCl at 20° C. The hydrochloric acid was distilled off, and the residue was taken up in water to a solution containing a total amount of 16 percent by weight of sugars. In order to split the polymeric sugars, the solution was after-hydrolyzed at 120° C. with a dilute hydrochloric acid containing .3 percent of HCl by weight. Then the solution was de-ionized by passing it through ion exchange resins, and concentrated to 40% sugar cotnent.

The sugar composition, calculated on dry substance, was as follows:

| | Percent |
|---|---|
| Polymeric sugars | 2.6 |
| Xylose | 82.2 |
| Glucose | 9.4 |
| Mannose, arabinose, galactose | 5.8 |
| | 100.0 |

The 40% sugar solution was continuously hydrogenated at a rate of 500 parts per hour in the apparatus shown in the drawing. The solution entered at a constant rate the autoclave 1, which had a capacity of 1000 l. and was kept at an inside temperature of 65° C. under a constant hydrogen pressure of 60 atm. 10 parts of finely divided Raney nickel were introduced at 5 for every 500 parts of solution. The pH of the solution was maintained within the range of 6.5 to 7.5 by addition of buffer substances. The hydrogenation degree of the effluent leaving the autoclave at 6 was about 90 to 92 percent.

The effluent was passed through the phase separator 7 and was pumped under increased pressure into the 3-step cyclone aggregate 14 in which a large part of the catalyst was recovered and recycled into the autoclave 1. The pressure increase compensated for the inherent pressure drop in the cyclones.

From the cyclones, the solution passed into the autoclave 1' which was similar to autoclave 1 but was operated at a temperature of 110° under a hydrogen pressure of 70 atm. Catalyst was added at 5' to adjust the amount to 15 parts. From the autoclave 1', the solution was passed again through a phase separator 7', a three-stage cyclone aggregate 14', and a filter in which the residual entrained catalyst was recovered. Like in the first stage, the recovered catalyst was recycled into the autoclave 1'.

The obtained polyol solution was purified by passage through ion exchangers and decolorizing resins, and contained then less than 0.1 percent of reducing sugars in the dry substance. Corresponding to the high xylose content of the starting sugar solution, the main component of the polyols was xylitol, which was recovered in high yield by simple crystallization from the concentrated solution (about 65 percent of the total polyols and 80 percent of the total xylitol). The high purity of the obtained xylitol was evidence that substantially no decomposition had taken place during the hydrogenation.

Separate catalyst cycles from cyclone 14 through vessel 16, pump 17, line 18 to line 3 (and 14'—16'—17'—18'—3', respectively) in each hydrogenation stage are of advantage because the concentration and load of the catalyst differ in the two stages. The concentration is higher in the second stage whereas the load is smaller (8 to 10% residual hydrogenation). The separate cycles contribute to the smooth progress of the reduction and prevent decomposition in the second stage operated at higher temperatures.

*Example 2*

1000 parts of a 12% prehydrolysis sugar solution, obtained from pine wood saw dust similarly as the sugar solution of Example 1 with the only difference that the hydrolysis had been carried out with a 36% HCl, were evaporated, following the after-hydrolysis, to a solution of 40% sugar. The sugars had the following composition, calculated on the dry substance:

| | Percent |
|---|---|
| Polymeric sugars | 4.6 |
| Galactose | 5.5 |
| Glucose | 42.3 |
| Mannose | 19.6 |
| Arabinose | 4.0 |
| Xylose | 24.0 |
| | 100.0 |

320 parts per hour of said 40% solution were continuously passed at a constant rate through two autoclaves, whereby 10 parts of Raney catalyst were added to the first autoclave 1. Said first autoclave was operated at a constant inside temperature of 70° C. and a constant hydrogen pressure of 60 atm. The effluent passed at a constant rate into the second autoclave 1', which was operated at a temperature of 110° C. and a hydrogen pressure of 40 atm. Each autoclave was provided with a separate hydrogen cycle but the catalyst was only recovered after passage of the solution through the entire apparatus and recycled into the first autoclave 1. In this case, a separate catalyst cycle for the first hydrogenation step could be omitted because of the lower proportion of unstable pentoses (xylose) in the starting solution.

There were obtained per hour 315 parts of a water clear pure polyol mixture.

I claim:

A process for the continuous reduction of a sugar mixture containing xylose and hexoses as obtained in the hydrolysis of pine wood, comprising passing an about 40 percent aqueous solution of said sugars with a hydrogenation catalyst first under a hydrogen pressure of about 60 atmospheres through a reaction zone maintained at a temperature of about 70° C., then passing the effluent of said first reaction zone with said hydrogenation catalyst at the same rate of travel as in said first reaction zone under a hydrogen pressure of about 40 atmospheres through a second reaction zone maintained at a temperature of about 110° C., completing the hydrogenation of the sugars in said second reaction zone, and recovering the obtained polyols from the effluent of said second reaction zone, each reaction zone being provided with a separate hydrogen cycle.

References Cited in the file of this patent

UNITED STATES PATENTS

| 2,271,083 | Lorand | Jan. 27, 1942 |
| 2,421,416 | Flexser | June 3, 1947 |
| 2,546,103 | Lolkema et al. | Mar. 20, 1951 |

FOREIGN PATENTS

| 514,693 | Great Britain | Nov. 15, 1939 |